United States Patent
Fimbres et al.

(10) Patent No.: US 11,506,105 B2
(45) Date of Patent: Nov. 22, 2022

(54) RETRACTILE TAIL PIPE FOR VEHICLE EXHAUST SYSTEM

(71) Applicant: Ford Global Technologies, LLC, Dearborn, MI (US)

(72) Inventors: Jorge Eduardo Fimbres, Huixquilucan (MX); Felix Cruz, Naucalpan de Juarez (MX); Christian Zamora, Cuautitlan Izcalli (MX); Emmanuel Caldera, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 259 days.

(21) Appl. No.: 16/840,223

(22) Filed: Apr. 3, 2020

(65) Prior Publication Data
US 2021/0310400 A1 Oct. 7, 2021

(51) Int. Cl.
*F01N 13/08* (2010.01)
(52) U.S. Cl.
CPC ................. *F01N 13/082* (2013.01)
(58) Field of Classification Search
CPC ............... F01N 13/082; F01N 13/08
See application file for complete search history.

(56) References Cited

U.S. PATENT DOCUMENTS

| | | | |
|---|---|---|---|
| 2,489,480 A | 11/1949 | Chester | |
| 2,584,674 A * | 2/1952 | Da Costa | F02M 26/14 180/54.1 |
| 3,348,629 A * | 10/1967 | Cassel | F01N 13/082 181/247 |
| 4,408,675 A * | 10/1983 | Keller | F01N 13/04 181/240 |
| 5,579,638 A | 12/1996 | Archer | |
| 7,086,224 B1 | 8/2006 | Perry | |
| 7,650,867 B2 * | 1/2010 | Williams | F02B 27/0215 123/184.55 |
| 8,683,792 B2 | 4/2014 | Atkinson et al. | |
| 2001/0047897 A1 * | 12/2001 | Steenackers | B60K 13/04 180/309 |
| 2007/0261398 A1 * | 11/2007 | Williams | F02B 27/0215 60/312 |
| 2011/0272613 A1 * | 11/2011 | Watanuki | F16K 1/222 251/304 |
| 2012/0204538 A1 * | 8/2012 | Atkinson | F01N 13/1816 60/273 |

FOREIGN PATENT DOCUMENTS

DE 4105057 A1 8/1992
JP S6293115 U * 6/1985

* cited by examiner

*Primary Examiner* — Anthony Ayala Delgado
(74) *Attorney, Agent, or Firm* — Vincent Mastrogiacomo

(57) ABSTRACT

Method and system are provided for a retractile exhaust tail pipe for vehicles. The system comprises an exhaust tube mounted to an underbody of a vehicle, an exhaust tip slidably mounted to the exhaust tube, the exhaust tip having a plurality of extension shafts fixed on a second end, and an exhaust tip retract module positioned on the exhaust tube circumscribing an outer surface, the exhaust tip retract module having an actuator, a gear, and a plurality of bearings that mate with the plurality of extension shafts on the exhaust tip. In one example, the system reduces a probability of vehicle tail pipes contacting a ground surface in an off-road condition.

20 Claims, 9 Drawing Sheets

RETRACTILE TAIL PIPE FOR VEHICLE EXHAUST SYSTEM

FIELD

The present disclosure relates generally to a retractile tail pipe system for use in an exhaust system of a vehicle.

BACKGROUND/SUMMARY

Automotive vehicles may be configured with various off-road capability features. However, the departure angle of many off-road vehicles is much smaller than their approach angle. This difference between the approach and the departure angles may cause several problems. In one example, when subjecting the vehicle to certain types of difficult terrain, due to its small departure angle, tail pipes of the vehicle may hit the ground causing scratches, compression, and potentially deformation of the tail pipes. This can have a negative impact on the way the customer perceives the capabilities of the vehicle.

One approach directed to reducing a probability of a tail pipe impacting a ground surface is taught in Atkinson et al. in U.S. Pat. No. 8,683,792. Therein, an extendible exhaust system is described that utilizes a pipe extender sliding along a tail pipe to prevent exhaust gas seepage into the passenger compartment of a vehicle. Movement of the pipe extender from the retracted to the extended position is caused by an electromagnet or motor drive with a movement sensor and springs. Another system is shown by Chester in U.S. Pat. No. 2,489,480. Therein, an exhaust pipe extension is described that consists of a length of tightly coiled helical spring with its forward portion sliding fitted over a rear end portion of exhaust pipe.

However, the inventors herein have recognized potential issues with such systems. As one example, the systems described in U.S. Pat. Nos. 8,683,792 and 2,489,480 still limit the departure angle of a vehicle. Moreover, the system of U.S. Pat. No. 8,683,792 retracts or extends the exhaust pipe only when the vehicle travels forward at a predetermined speed. Additionally, the coiled spring used in the system of U.S. Pat. No. 2,489,480 to move the pipe extension may lose its elastic stiffness over time rendering the system unstable and/or increase vehicle NVH.

The inventors herein have recognized the above issues, and others, and therefore in order to reduce a probability of vehicle tail pipes contacting a ground surface, while at least partially addressing one or more of the above identified issues, they have developed a retractile tail pipe system. In one example, the retractile tail pipe system comprises an exhaust tube mounted to an underbody of a vehicle, an exhaust tip slidably mounted to the exhaust tube, the exhaust tip having a plurality of extension shafts fixed on a second end, and an exhaust tip retract module positioned on the exhaust tube circumscribing an outer surface, the exhaust tip retract module having an actuator, a gear, and a plurality of bearings that mate with the plurality of extension shafts on the exhaust tip.

In an example, a retractile tail pipe system may include an exhaust tip physically separated from an exhaust tube in order to allow relative movement between both components. An exhaust tip retract module (ETRM) is attached and fixed to the upstream exhaust tube in a rearmost possible position that may also act as the travel limit for the exhaust tip. The ETRM is configured to have an actuator, a gear, and multiple linear bearings. The exhaust tip includes a set of extension shafts that mate with the linear bearings in the ETRM. One of the extension shafts comprises a plurality of ridges, which may be teeth-like structures, on a portion of its surface that is configured to engage with the gear. The system may be actuated by an electric motor causing the gear to rotate, that in turn, causes a linear motion of the extension shafts via a rack and pinion mechanism. As a result, a backward or forward movement of the extension shafts may occur, such that the exhaust tip either retracts or extends to a default position.

The retractile tail pipe system, according to the present disclosure, enables the exhaust tips to be retracted a certain length when in an off-road mode in order to take the exhaust tips out of the way and changing the limiting component to be a rear bumper instead of the tips, while creating a robust actuation configuration that is able to survive various environmental conditions while also creating a stiff structure to reduce NVH. Therefore, this system is capable of increasing the departure angle of a vehicle under off-road conditions that can reduce the probability of a tail pipe impacting the ground surface.

The retractile tail pipe of the present disclosure may be applied to vehicles with an exhaust system, including but not limited to pickup trucks, SUVs, vans, sedans, hatchback, coupe, and so on. In addition to four-wheelers, the present disclosure may also be applied to three-wheelers having an exhaust system. The system of the present disclosure may allow customers to traverse through rough terrain in a more secure manner, thereby reducing the likelihood of exhaust tubes hitting the ground and transmitting noise and vibration to the driver. Additionally, the application of this system does not interfere with the looks, styling, or aesthetics of a vehicle. Moreover, the use of multiple extension shafts makes the retractile tail pipe system more stable.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-6 are shown to scale, although other relative dimensions may be used if desired.

DETAILED DESCRIPTION

Figure 1:
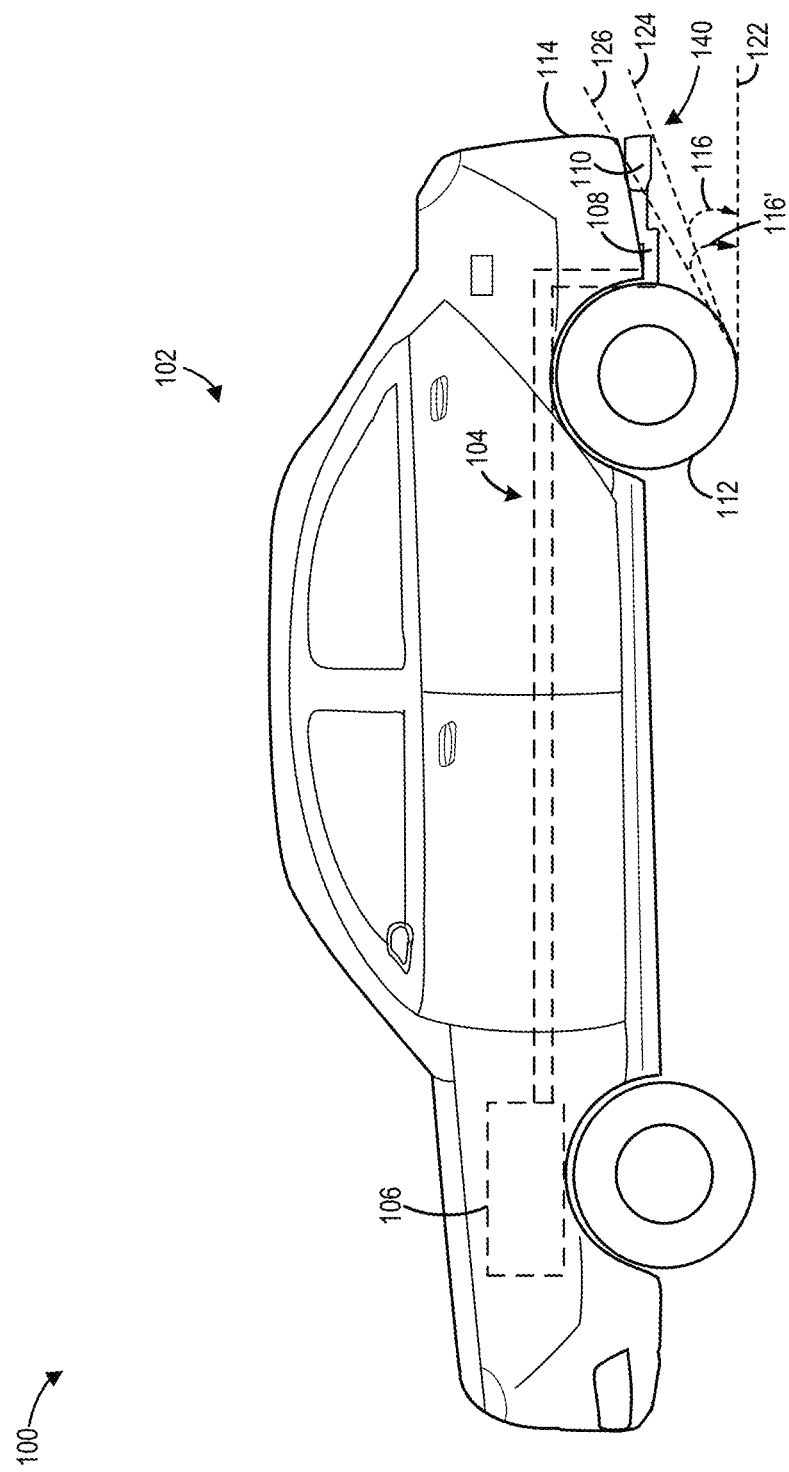
FIG. 1 shows a side view of an exemplary vehicle including a retractile exhaust tail pipe system.
Figure 2A:
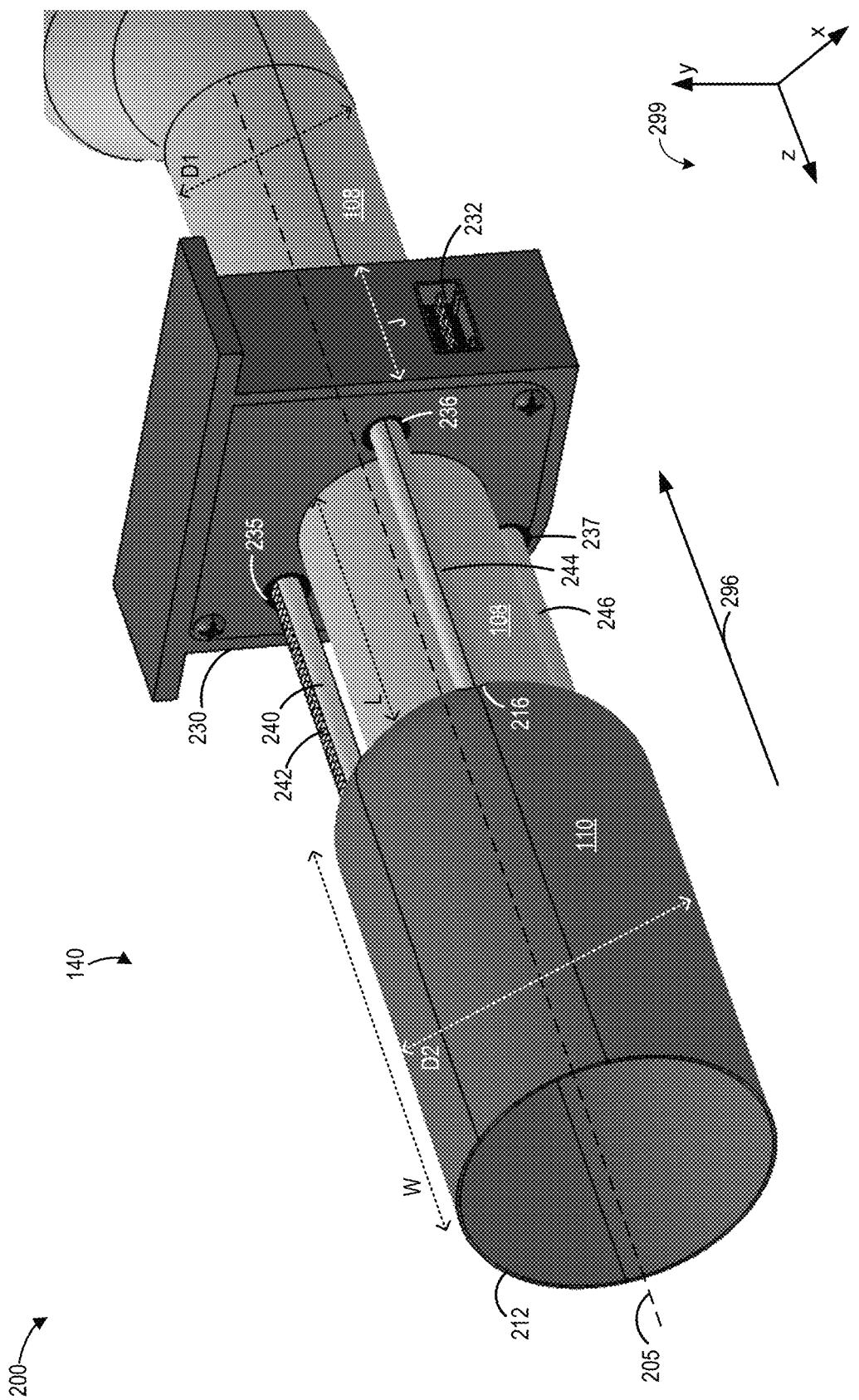
FIGS. 2A and 2B show a perspective view of a retractile tail pipe in an extended configuration in accordance with an example of the present disclosure.
Figure 2B:
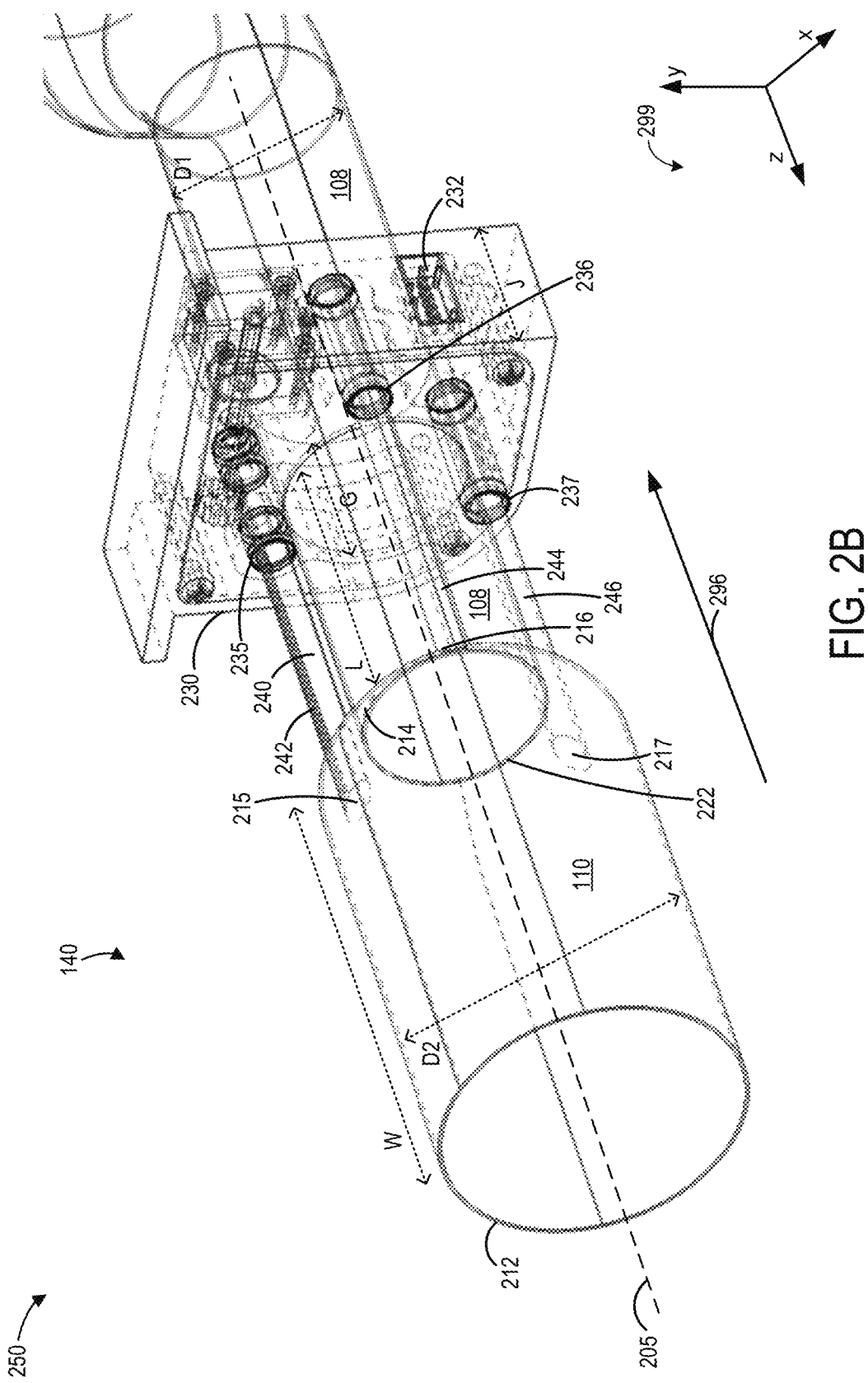
Figure 3:
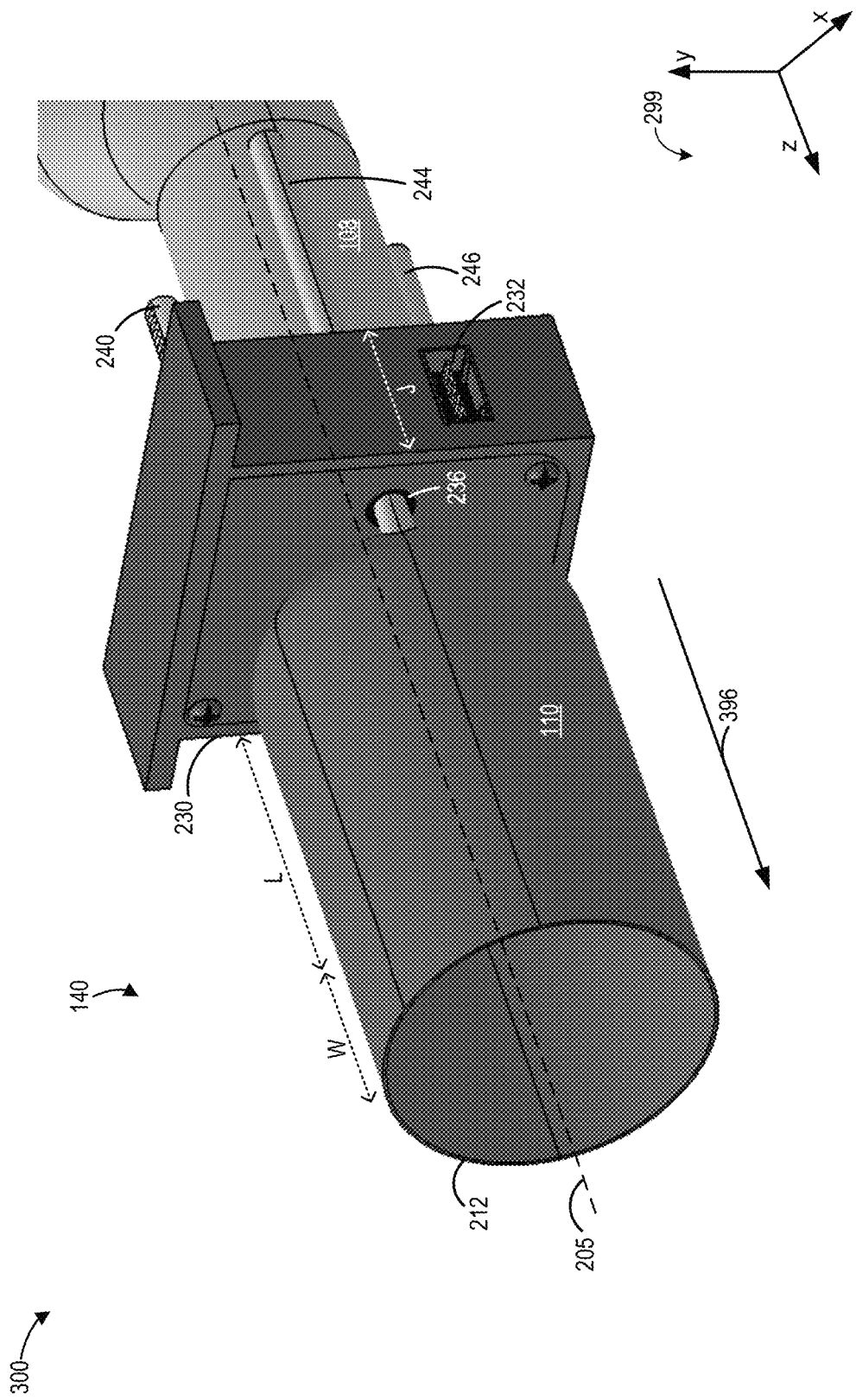
FIG. 3 shows a perspective view of the retractile tail pipe of FIG. 2A in a retracted configuration in accordance with an example of the present disclosure.
Figure 4A:
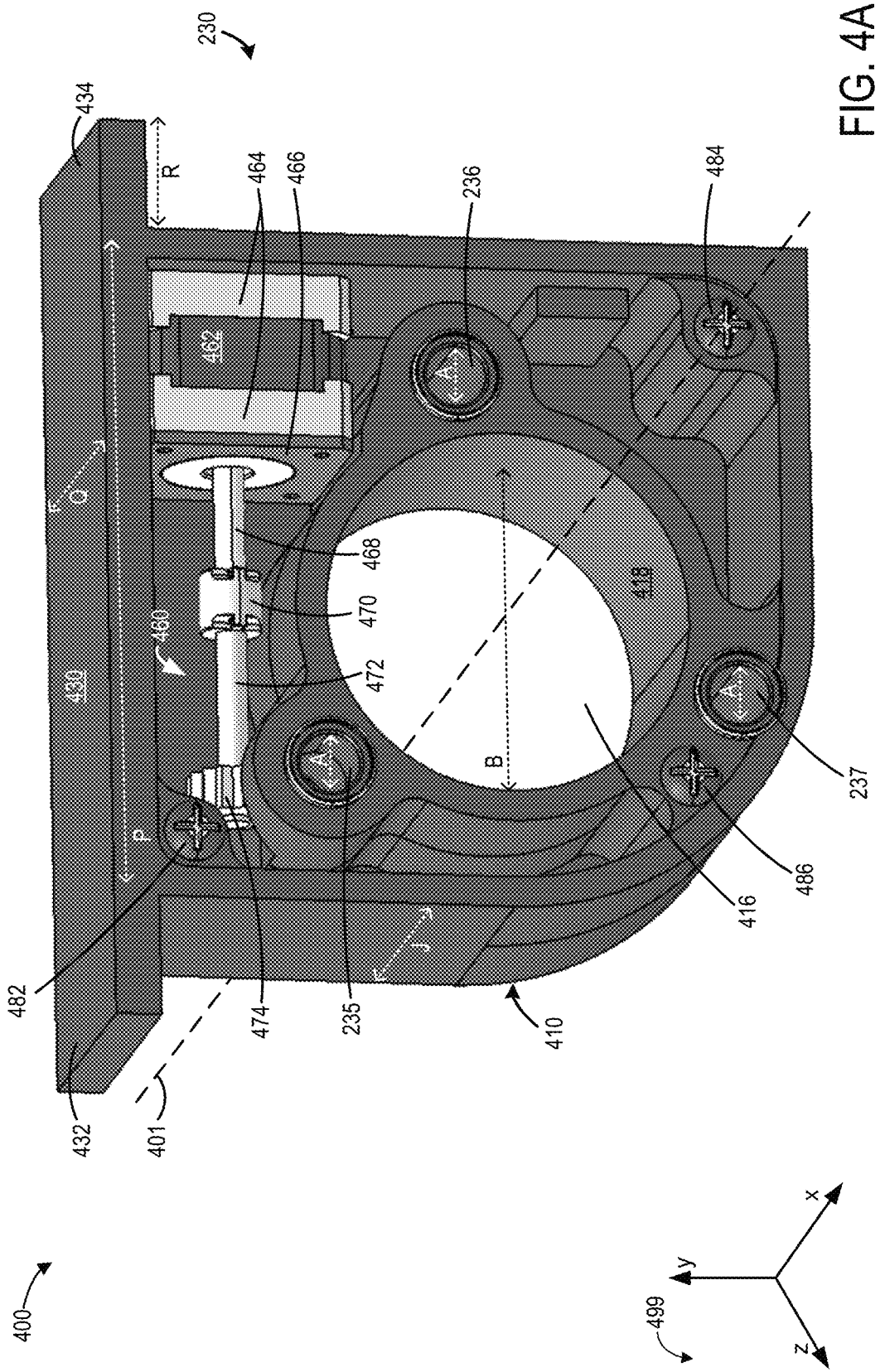
FIG. 4A shows a perspective view of an exhaust tip retract module (ETRM) of the retractile tail pipe system of FIG. 2B in accordance with an example of the present disclosure.
Figure 4B:
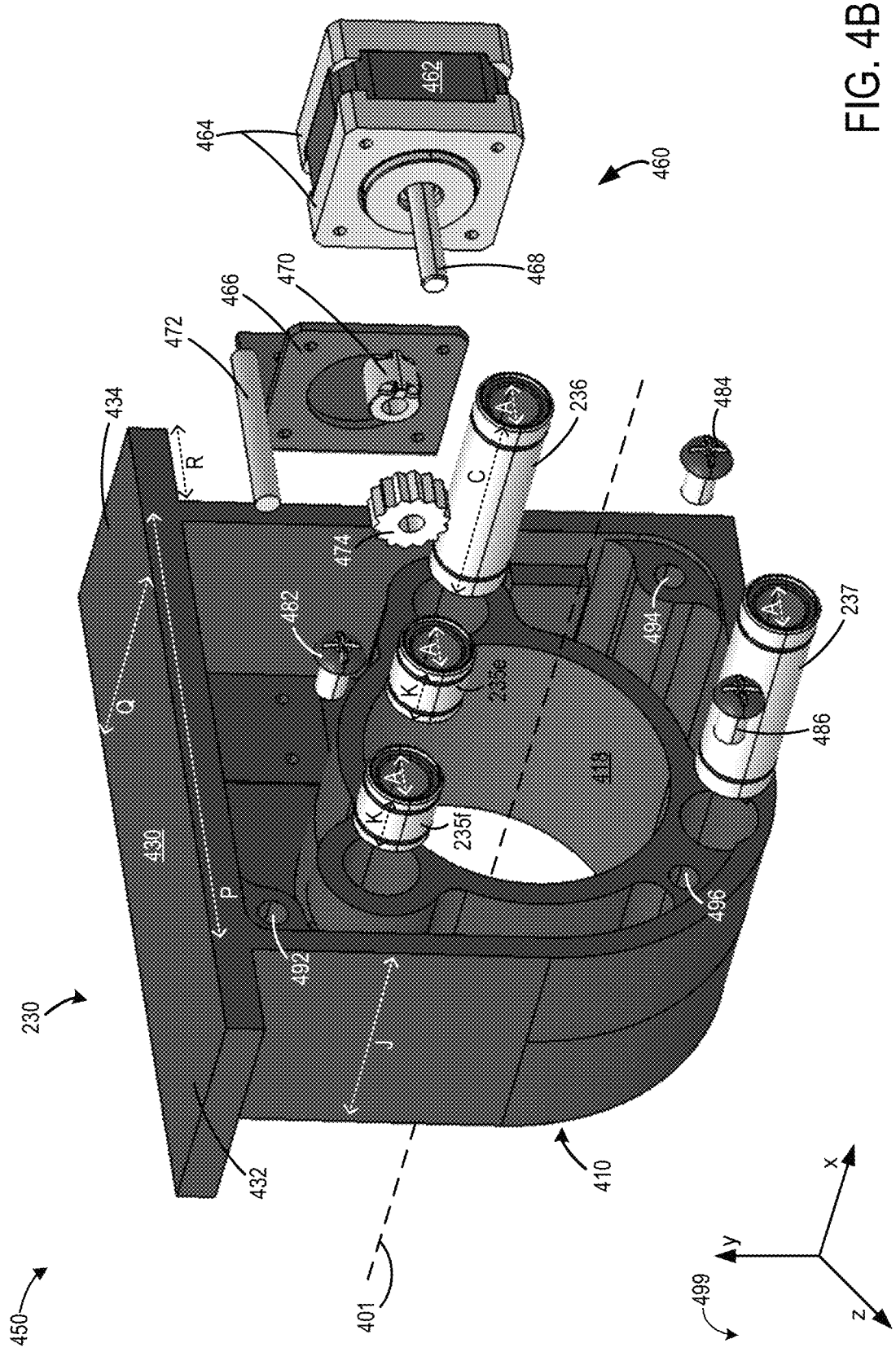
FIG. 4B shows an exploded view of the exhaust tip retract module (ETRM) of FIG. 4A, revealing various internal components.
Figure 5:
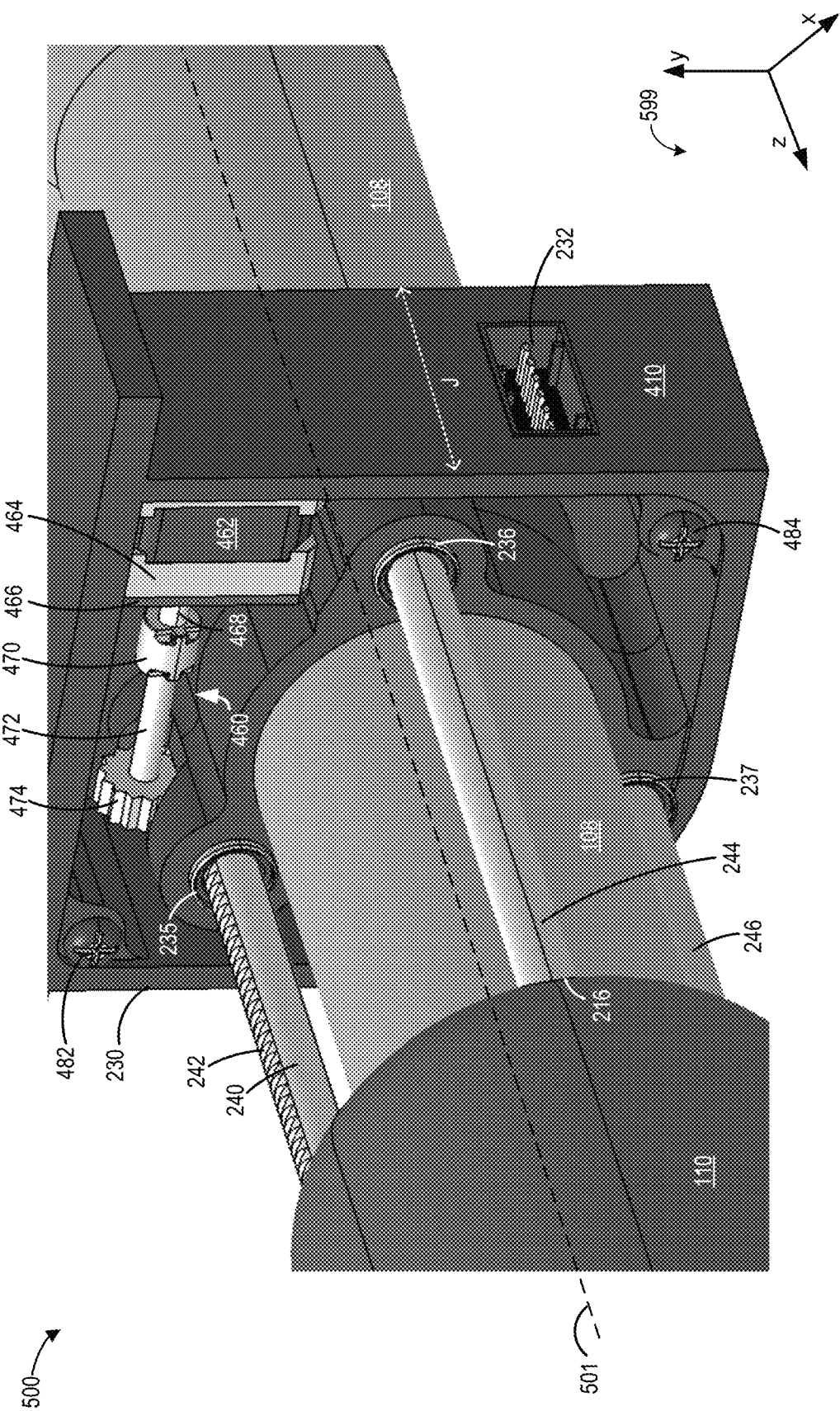
FIG. 5 shows a close up view of the retractile tail pipe system of FIG. 2B with the ETRM revealing the internal structure.
Figure 6:
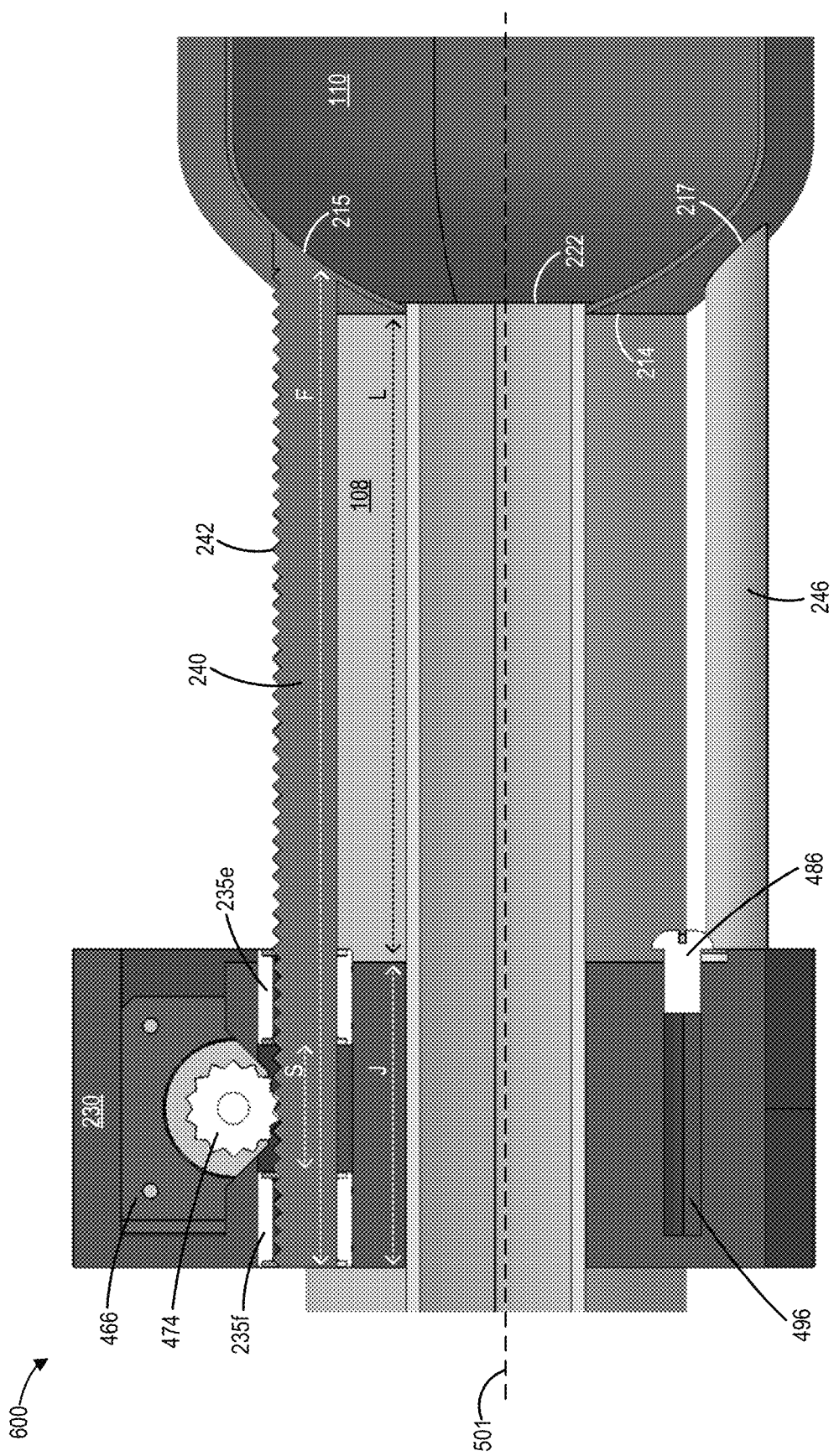
FIG. 6 shows a cross-sectional view of the retractile tail pipe system of FIG. 5 in accordance with an example of the present disclosure.
Figure 7:
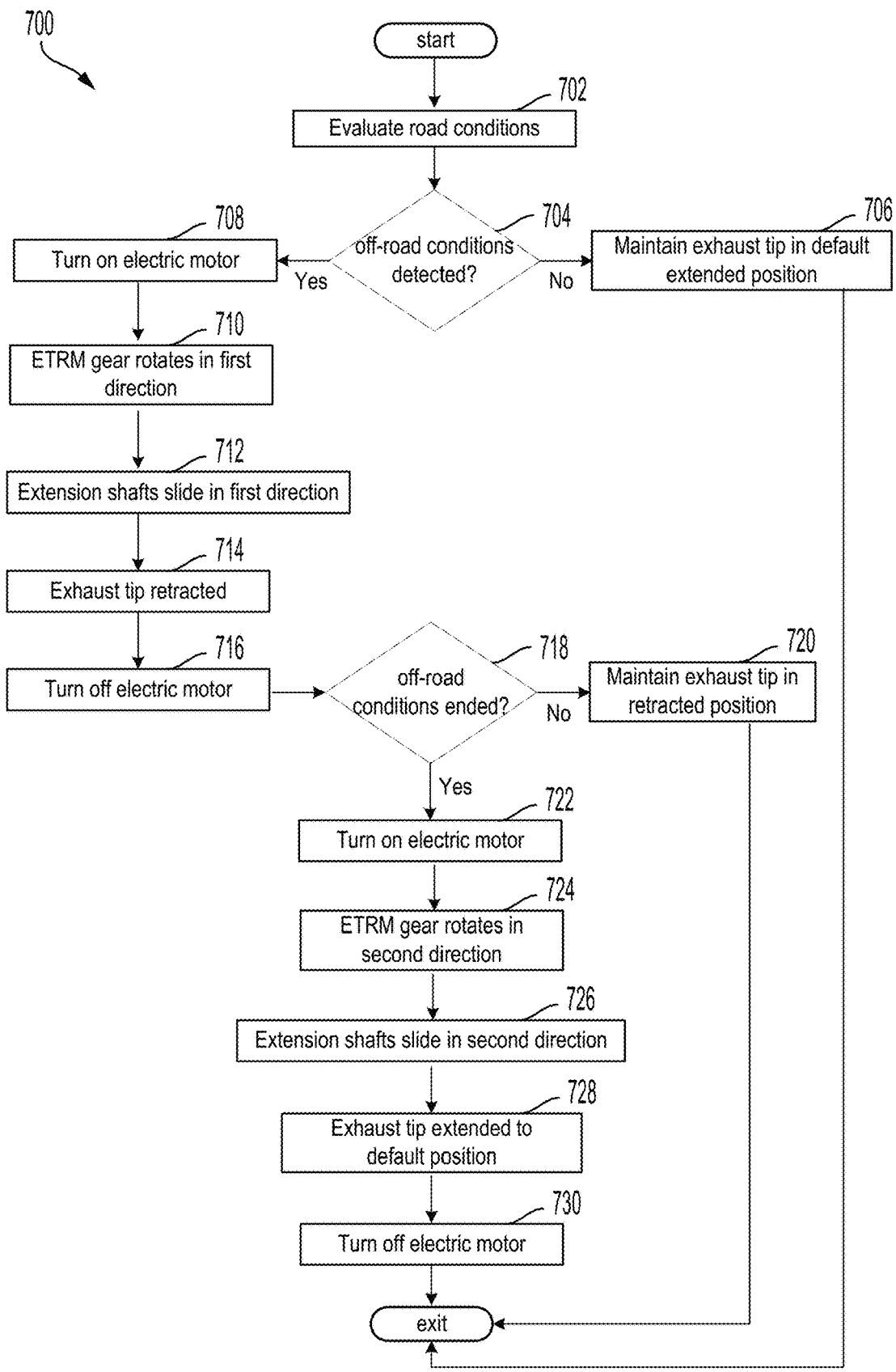
FIG. 7 shows a flow-chart of a method for extension or retraction of an exhaust tip of a retractile tail pipe system in accordance with an example of the present disclosure.

The following description relates to a retractile tail pipe system and methods for using the same. In one example, the retractile tail pipe is connected to an exhaust system of a vehicle. An exemplary vehicle including the retractile tail pipe system, according to the present disclosure, is shown in FIG. 1. FIGS. 2A-B and 3 illustrate perspective views of the retractile tail pipe in extended and retracted configurations, respectively. In FIGS. 4A and 4B, a general perspective view of an exhaust tip retract module (ETRM) associated with the retractile tail pipe system is shown. Various components of an electromechanical actuator housed inside the ETRM are revealed. A retractile tail pipe with an ETRM showing the internal electromechanical actuator is illustrated in FIG. 5 and a cross-sectional view of the system is shown in FIG. 6. FIG. 7 shows a high level flow-chart of a method for extending or retracting an exhaust tip of the retractile tail pipe system under normal operation and in an off-road mode.

FIG. 1 shows a side view 100 of an exemplary vehicle 102 comprising an exhaust system 104. The exhaust system 104 is shown connected to an engine 106 of the vehicle 102. The exhaust system 104 comprises a retractile tail pipe 140 that further includes an exhaust tube 108 and an exhaust tip 110, physically separated from each other. Although the retractile tail pipe 140 is shown here in the context of a sedan, it will be appreciated that the retractile tail pipe 140 may be used with any type of vehicle having an engine and an exhaust system, such as trucks, pickup trucks, vans, SUVs, crossovers, hatchback, hybrid vehicles, etc.

Some of the factors that may be crucial for off-roading ability of a vehicle are departure and approach angles of a vehicle. As shown in FIG. 1, a departure angle is defined as an angle 116 between a ground 122 and a line 124 drawn between a rear tire 112 and a lowest-hanging part (e.g., exhaust tip 110) in the back of the vehicle 102. In most vehicles, the departure angle 116 is the maximum ramp angle from which a vehicle can descend without hitting the tail pipe. An approach angle (not shown in FIG. 1) is the counterpart of a departure angle at the front of a vehicle. The departure angle of several off-road vehicles is much smaller than their approach angle due to the presence of exhaust tail pipes. As an example, the departure and approach angles of F-150 Raptor are 23☐ and 30.2 ☐, respectively.

However, if the exhaust tip 110 of the tail pipe 140 is taken out of the way, the lowest-hanging part in e hack of the vehicle 102 would be a rear bumper 114, instead of the exhaust tip 110. Consequently, the departure angle 116 will increase. A new departure angle 116' would be formed between the ground 122 and a line 126 drawn between the rear tire 112 and the rear bumper 114. An increase in the departure angle of a vehicle will reduce the likelihood of tail pipe impacting the ground surface, when subjecting the vehicle to off-road course, such as rough or rocky terrain.

FIG. 2A shows a perspective view 200 of the retractile tail pipe 140 of FIG. 1 in a fully extended configuration and FIG. 2B illustrates a transparent view 250 of the retractile tail pipe of FIG. 2A. As such, components previously introduced are numbered similarly in subsequent figures. FIGS. 2A-B will be described herein collectively. The retractile tail pipe 140 comprises an exhaust tube 108, an exhaust tip 110, an exhaust tip retract module (ETRM) 230, and a plurality of extension shafts. A central longitudinal axis 205 of rotation of the retractile tail pipe 140 is depicted by a dashed line for reference. The central axis 205 may be parallel to the z-axis of reference axes 299.

The exhaust tube 108 is a long cylindrical hollow tube configured to carry exhaust gases released from an engine of a vehicle. The exhaust tube 108 has a diameter referred to as D1. A first extreme end (not shown in FIGS. 2A-B) of the exhaust tube 108 may be connected directly to a vehicle engine. As shown in FIG. 2B, a second extreme end of the exhaust tube 108, opposite the first, shows a circumferential edge 222 that may be connected to the exhaust tip 110.

The exhaust tip 110 is a short cylindrical hollow tube slidably mounted to the second extreme end of the exhaust tube 108. However, the exhaust tip 110 and the exhaust tube 108 are physically separate from each other. The exhaust tip 110 has a diameter referred to as D2. In the illustrated example, the diameter D2 of the exhaust tip 110 is larger than the diameter D1 of the exhaust tube 108. The exhaust tip 110 shows a circumferential edge 212 at a first extreme end and a circumferential edge 214 at a second extreme end, opposite the first. The second extreme end of the exhaust tip 110 curves inwards, such that the circumferential edge 214 of the exhaust tip 110 circumscribes an outer surface of the exhaust tube 108. This provides a sealed environment leaving no gap between the exhaust tip 110 and the exhaust tube 108. Also, except for the circumferential edge 214, no other region of the exhaust tip 110 makes direct contact with the outer surface of the exhaust tube 108. Therefore, the circumferential edge 214 of the exhaust tip 110 has a smaller circumference than the circumferential edge 212.

As shown in FIG. 2B, in a fully extended configuration, the exhaust tip 110 encloses the circumferential edge 222 of the exhaust tube 108. However, the exhaust tip 110 is configured to slide back and forth along the central axis 205 with the help of an exhaust tip retract module and a plurality of extension shafts, which are discussed in more details below.

The exhaust tip retract module (ETRM) 230 is mounted on the exhaust tube 108, such that the ETRM 230 is located at a distance/length L from the second extreme end of the exhaust tube 108. The ETRM 230 is positioned in a way, such that it circumscribes an outer surface of the exhaust tube 108 and encloses a length G of the exhaust tube 108. The ETRM 230 has a housing with a width J, which may be similar to the length G of the exhaust tube 108 circumscribed by the ETRM. The ETRM 230 houses an electromechanical actuator, a gear and a plurality of linear bearings. Additionally, the ETRM housing includes an in-built connector 232 that allows current to pass through in order to provide power to the actuator. More details on the internal structure of the ETRM 230 will be presented in FIGS. 4A-B. In the illustrated example, a total of three linear bearings (a first linear bearing 235, a second linear bearing 236, and a third linear bearing 237) are included in the ETRM 230. Additionally, each linear bearing includes a hollow region and a smooth inner cylindrical surface. The hollow region of each linear bearing runs through the entire width J of the ETRM 230 and is adapted to receive a corresponding extension shaft.

The exhaust tip 110 includes a plurality of extension shafts. In the illustrated example, a total of three extension shafts are shown, a first extension shaft 240, a second extension shaft 244, and a third extension shaft 246. Each extension shaft is configured as a long cylindrical rod having two extreme ends. A first extreme end of each extension shaft is attached to the exhaust tip 110 close to the circumferential edge 214. A second extreme end, opposite the first, of each extension shaft is configured to mate with the corresponding linear bearing in the ETRM 230. For example, the first extension shaft 240 attaches the exhaust tip 110 at a position 215 and also mates with the first linear bearing 235 in the ETRM 230. The second extension shaft 244 attaches the exhaust tip 110 at a position 216 and also mates with the second linear bearing 236 in the ETRM 230. The third extension shaft 246 attaches the exhaust tip 110 at a position 217 and also mates with the third linear bearing 237 in the ETRM 230. The second extreme end of each extension shaft runs through the hollow region of the corresponding linear bearing in the ETRM 230.

As shown in FIGS. 2A-B, the first extension shaft 240 includes a plurality of ridges, such as teeth-like structures 242 on a portion of its outer cylindrical surface, throughout a length of the first extension shaft. The ridges may also be shaped with vertical teeth walls as an alternative example. The second extension shaft 244 and the third extension shaft 246, however, comprise a smooth outer cylindrical surface throughout their lengths. It is the extension shaft with multiple teeth-like structures that is configured to receive a torque from the internal electromechanical actuator, while the other two extension shafts with smooth outer cylindrical surface are only configured to support the exhaust tip. The working mechanism of the retractile tail pipe system will be described in more detail in FIGS. 5 and 6.

Although, in the illustrated example three extension shafts and three corresponding linear bearings are indicated; in other examples, the system may comprise any suitable number of extension shafts and spatially corresponding linear bearings. However, the number of extension shafts may be equal to the number of corresponding linear bearings for enhanced coupling of the exhaust tip 110 and the ETRM 230. The use of multiple extension shafts and spatially corresponding linear bearings increases the number of attachment points, and thus, increases the stability of the system. Additionally, the spacing between two extension shafts and the spacing between the two corresponding linear bearings are designed equally. This feature may provide an even load distribution. Moreover, in yet other examples, any one of the plurality of extension shafts may include the teeth-like structures on a portion of its outer cylindrical surface, while the rest of the extension shafts have a smooth outer cylindrical surface throughout their lengths.

As depicted in FIGS. 2A-B, during normal operation of a vehicle, the exhaust tip 110 is fully extended a certain length, referred to as W, beyond the second extreme end of the exhaust tube 108, albeit enclosing the circumferential edge 222. This is the default position of the exhaust tip 110. However, during off-road conditions, this system enables the exhaust tip 110 to be retracted, such that the extension shafts are displaced along the central axis 205 in a first direction indicated by an arrow 296 and the exhaust tip 110 travels the length L of the exhaust tube 108 to reach a rearmost possible position. The ETRM 230 may serve as a travel limit for the exhaust tip 110 during the process of retraction.

Turning to FIG. 3, a perspective view 300 of the retractile tail pipe 140 of FIG. 2A is shown in a fully retracted configuration. As depicted, the exhaust tip 110 has traveled the entire length L of the exhaust tube 108 to reach the rearmost possible position close to the ETRM 230. In this fully retracted configuration, the exhaust tip 110 completely encloses the length L of the exhaust tube 108. As a result, the length W corresponding to the original length enclosed by the exhaust tip 110 in a fully extended configuration decreases to a shortest possible length. Therefore, in this position, the fully retracted exhaust tip shortens the exhaust path that the exhaust gas must travel before getting released.

As shown in FIG. 3, the plurality of extension shafts is displaced completely, such that the extension shafts visibly appear on the other side of the ETRM 230. A length of displacement of the extension shafts may be controlled based on whether the exhaust tip 110 is required to be retracted fully or partially. Although, FIG. 3 shows a fully retracted configuration of the retractile tail pipe system 140, the exhaust tip 110 may be retracted partially, if desired.

The retractile tail pipe system 140 enables the exhaust tip 110 to be retracted when in off-road mode a certain length within 5 inches to prevent the tail pipe from contacting the ground surface. As the exhaust tip 110 travels the length L in preparation for retraction from an extended position, the length of the exhaust tube 108 being overlapped by the exhaust tip 110 increases with a corresponding decrease in the length W. However, as the exhaust tip 110 travels the length L in preparation for extension from a retracted position, the length of the exhaust tube 108 being overlapped by the exhaust tip 110 decreases with a corresponding increase in the length W.

In order for the exhaust tip 110 to be extended back to the default position from the fully retracted configuration shown in FIG. 3, the plurality of extension shafts is actuated to be displaced along the central axis 205 in a second direction indicated by an arrow 396, such that the exhaust tip 110 travels the length L of the exhaust tube 108 to reach a position farthest from the ETRM 230. This, simultaneously, causes the exhaust tip 110 to extend back to the default position.

In this way, relative movements between the exhaust tube 108 and the exhaust tip 110 under the control of the ETRM 230, allows either retraction or extension of the exhaust tip 110 guided by the direction of displacement of the extension shafts. A detailed method of retraction/extension of the exhaust tip 110 will be presented in FIG. 7.

FIGS. 4A-B provide a detailed view of the exhaust tip retract module (ETRM). FIG. 4A shows a perspective view 400 of the ETRM 230 of the retractile tail pipe 140 of FIG. 2A, revealing various internal components. FIG. 4B shows an exploded view 450 of the ETRM 230 of FIG. 4A. As such, FIGS. 4A-B will be described herein collectively. The exhaust tip retract module (ETRM) 230 broadly comprises a housing 410, and an internal mechanism 460. The ETRM houses an electromechanical actuator that actuates the retraction and/or extension of the retractile tail pipe system. The various components of the ETRM 230 will be described in more detail below. A central longitudinal axis 401 of rotation of the ETRM 230 is depicted by a dashed line for reference. The central axis 401 may be parallel to the x-axis of reference axes 499.

The housing 410 of the ETRM has a substantial cylindrical shape in order to fit around the exhaust tube. The substantial cylindrical shape of the ETRM is important for maintaining stability of the exhaust tip of the retractile tail pipe system. The cylindrical housing 410 of the ETRM has the width J, as described previously. A hollow cylindrical region 416 is present in the center of the housing 410 of the ETRM through which passes the exhaust tube. The hollow cylindrical region 416 has a diameter, referred to as B. With reference to FIGS. 2A-B and 4A, the diameter B of the hollow cylindrical region 416 of the ETRM may be relatively greater than the diameter D1 of the exhaust tube 108, such that when the exhaust tube 108 passes through the hollow cylindrical region 416 of the ETRM 230, the length G of the outer surface of the exhaust tube 108 may be in face sharing contact with an inner cylindrical surface 418 of the ETRM.

In another embodiment, the outer surface of the exhaust tube 108 may not be in direct contact with the inner cylindrical surface 418 of the ETRM 230. It is imperative that the ETRM is mounted on the exhaust tube in a way that heat transfer from exhaust gases to the ETRM is minimized in order to prevent thermal damage to the internal components of the ETRM. Therefore, the inner cylindrical surface 418 of the ETRM may be lined with a damper (not shown in FIGS. 4A-B). The damper is a heat-resistant soft material that may run along the circumference of the inner cylindrical surface 418 of the ETRM and prevents the ETRM from an impact of the heat. In this embodiment, when the exhaust tube passes through the hollow cylindrical region 416 of the ETRM, the damper may be sandwiched between the outer surface of the exhaust tube and the inner cylindrical surface 418 of the ETRM.

As shown in FIGS. 4A-B, a top region of the housing 410 of the ETRM 230 has a flat surface 430. The flat surface 430 assists in attaching the ETRM to an underbody of a vehicle. The flat surface 430 may have a length P and a width Q. The width Q of the flat surface 430 may be similar to the width J of the cylindrical housing 410 of the ETRM. The flat surface 430 of the ETRM includes two extended regions; a first extended region 432 and a second extended region 434, opposite the first. The first extended region 432 and the second extended region 434 each have the same length, referred to as R. Additionally, each of the first extended region 432 and the second extended region 434 may include a mounting hole (not shown). A mounting screw (not shown) may be used through each mounting hole to attach the ETRM 230 to an underbody of a vehicle.

Although not shown in FIGS. 4A-B, the housing 410 of the ETRM 230 includes an in-built connector 232 for power and communication. The connector 232 was shown and briefly discussed in FIGS. 2A-B. The connector 232 may include a plurality of prongs and may allow an electrical current to pass through in order to provide power to the internal mechanism 460 of the ETRM 230. Communication between microcontroller-based sensors may occur via CAN (controller area network) bus or LIN (local interconnect network) protocol.

Moving to the internal mechanism 460 of the ETRM 230, additional components may be revealed. As depicted in FIG. 4B, the internal mechanism 460 of the ETRM further comprises an electric motor 462, an electric motor mounting bracket 466, a shaft 472, a flexible coupler 470, a gear 474, and a plurality of linear bearings. These components may be packaged inside the housing 410 of the ETRM as shown in FIG. 4A.

The electric motor 462 serves as an electromechanical actuator that converts electricity into mechanical energy. In the illustrated example, a stepper motor has been used as the actuator. In other examples, however, various other types of electric motor may be used, e.g., brushless DC motor, linear motor, servo motor, etc. The electric motor assembly further comprises a motor housing 464 and a motor shaft 468. The motor housing 464 encloses the electric motor 462 from two sides, a first side and a second side, opposite the first, such that the electric motor 462 is sandwiched between the motor housing 464. The motor shaft 468 is a cylindrical rod-like structure having two ends, a first end and a second end, opposite the first. The first end of the motor shaft 468 is shown to be connected to a central region of the electric motor 462. The electric motor assembly is mounted inside the housing 410 of the ETRM 230 via the electric motor mounting bracket 466, as shown in FIG. 4A. The mounting bracket 466 serves as a supporting structure that provides support to the overall electric motor assembly.

The shaft 472, another internal component of the ETRM, is also a cylindrical rod-like structure having two ends, a first end and a second end, opposite the first. The first end of the shaft 472 is shown to be connected to the second end of the motor shaft 468 of the electric motor assembly via the flexible coupler 470. In other words, the internal components of the ETRM are packaged in a way, such that the flexible coupler 470 couples the second end of the motor shaft 468 to the first end of the shaft 472. Additionally, the second end of the shaft 472 is connected to the gear 474. In the illustrated example, the gear 474 is configured as a cylindrical structure having a plurality of gear teeth on an outer cylindrical surface and a hollow cylindrical region in the center. The central hollow cylindrical region of the gear 474 is configured to accommodate the second end of the shaft 472. The gear 474 is positioned inside the ETRM in a way, such that the plurality of gear teeth meshes with the plurality of teeth-like structures of the first extension shaft 240, similar to a rack and pinion assembly which will be described in more detail in FIGS. 5-6.

The presence of three linear bearings in the ETRM that are configured to mate with three extension shafts has been described previously, with reference to FIGS. 2A-B. As appreciated by FIG. 4A, the first linear bearing 235, the second linear bearing 236, and the third linear bearing 237 are fixed to the cylindrical housing of the ETRM and are positioned equidistant from each other. The linear bearings run along the entire width J of the cylindrical housing of the ETRM. The first linear bearing 235, the second linear bearing 236, and the third linear bearing 237 each includes a hollow cylindrical region having a diameter A. Additionally, each linear bearing has a smooth inner cylindrical surface.

As described previously in FIGS. 2A-B, each linear bearing of the ETRM is configured to mate with its corresponding extension shaft, such that the second extreme end of the extension shaft inserts into the hollow cylindrical region of the linear bearing. As such, a diameter of the extension shaft may not be equal to or exceed the diameter A of the hollow cylindrical region of its corresponding linear bearing. With reference to FIGS. 2A-B and 4A, the diameter A of the hollow cylindrical region of a linear bearing may be relatively greater than the diameter of its corresponding extension shaft, such that the outer surface of the extension shaft may be in face sharing contact with the inner cylindrical surface of the linear bearing.

The exploded view of the ETRM shown in FIG. 4B provides more detail on the features of each linear bearing. The second linear bearing 236 and the third linear bearing 237, each is configured as a single piece having a length referred to as C. The length C of the second and third linear bearings may be similar to the width J of the cylindrical housing 410 of the ETRM. The first linear bearing 235, however, is assembled differently than the rest. As discussed previously, the gear 474 is configured to engage with the first extension shaft 240 which is accommodated in the first linear bearing 235. Due to this feature, the first linear bearing 235 is configured in a way such that it includes two identical pieces, instead of a single piece. As shown in FIG. 4B, the first linear bearing 235 includes a first piece 235$e$ and a second piece 235$f$. Each of the first piece 235$e$ and the second piece 235$f$ has a length referred to as K, which may be approximately one third of the length C of the second linear bearing 236 or the third linear bearing 237. The first piece 235e and the second piece 235f of the first linear bearing 235 are arranged in the ETRM in a way, such that a certain portion of the first extension shaft 240 is always exposed to make contact with the gear 474. More details regarding the specific arrangement of the ETRM components will be presented in FIGS. 5-6.

As described previously in FIGS. 2A-B, three linear bearings have been illustrated in this example; however, in other examples, the system may comprise any suitable number of linear bearings and spatially corresponding extension shafts. Additionally, each set of diameters for each linear bearing/extension shaft pair may be configured to be similar or different based on the stability of the system.

FIGS. 4A-B also show a plurality of screws (a first screw 482, a second screw 484, and a third screw 486) as well as a plurality of screw holes (a first screw hole 492, a second screw hole 494, and a third screw hole 496) on the cylindrical housing 410 of the ETRM. The first screw 482 is configured to mate with the first screw hole 492. The second screw 484 is configured to mate with the second screw hole 494. The third screw 486 is configured to mate with the third screw hole 496. The plurality of screws and the corresponding screw holes may be used to mount a front lid (not shown in FIGS. 4A-B) on the ETRM to protect or conceal the internal components of the ETRM 230. Although, in the illustrated example, a total of three screws and the corresponding screw holes are indicated, other examples may include any suitable number of screws and spatially corresponding screw holes on the cylindrical housing 410 of the ETRM.

Turning to FIGS. 5-6, a detailed view of the interaction between different components of the retractile tail pipe system is shown. FIG. 5 shows a close up perspective view 500 of the retractile tail pipe according to the present disclosure, with the ETRM revealing the internal structure. FIG. 6 shows a cross-sectional view 600 of the retractile tail pipe of FIG. 5. FIGS. 5-6 are described herein collectively. A central axis 501 of rotation of the retractile tail pipe may be parallel to the z-axis of reference axes 599. Further, the cross-sectional view 600 shown in FIG. 6 is defined by an axial cut of the tail pipe of FIG. 5 in the y-z plane, as indicated by reference axes 599, in order to show an interior of the retractile tail pipe system. The axial cut plane may pass through the gear 474 and the first extension shaft 240, such that the axial cut divides the system into two unequal parts.

As depicted in FIGS. 5 and 6, the retractile tail pipe system is shown in a fully extended configuration. As shown, the gear 474 inside the ETRM 230 meshes with only one of the three extension shafts. In the illustrated example, the gear 474 engages with the first extension shaft 240 comprising the plurality of teeth-like structures 242. The remaining two extension shafts mate with their corresponding linear bearings to provide support to the exhaust tip 110 and allow a non-friction surface for the exhaust tip 110 to move back and forth. Due to this configuration, the exhaust tip 110 receives torque only through one of the three extension shafts via a rack and pinion mechanism, which will be described in more details below.

The cross-sectional view shown in FIG. 6 provides more detail on the configuration of the gear 474 and the first extension shaft 240. The first extension shaft 240 may have a length referred to as F. The length F of the extension shaft may be similar to the combination of the length L of the exhaust tube 108 and the width J of the ETRM 230. As described previously and also shown in FIGS. 5-6, the first extension shaft 240 comprises the plurality of teeth-like structures 242 on a top portion throughout the length F. Inside the ETRM 230, the gear 474 is configured to rest on top of the teeth-like structures 242 of the first extension shaft 240, such that the gear teeth engage directly with grooves present between two consecutive teeth-like structures on the first extension shaft 240. Additionally, FIG. 6 indicates the position of the two identical pieces (the first piece 235e and the second piece 235f) of the first linear bearing 235 with respect to the gear 474. In the ETRM, the gear 474 is positioned in a way such that a length S out of the entire length F of the first extension shaft 240 is configured to have no bearing, so it can engage with the gear 474. However, in the ETRM, the regions of the first extension shaft 240 on either side of the contact point with the gear 474 are enclosed with the two identical pieces of the linear bearing 235, one on each side.

The gear 474 engaging with the teeth-like structures 242 of the first extension shaft serves as the rack and pinion assembly that ultimately provides torque to the exhaust tip 110 for retraction or extension. A rack and pinion is a type of linear actuator that comprises a circular gear (the pinion) engaging a linear gear (the rack), which operate to translate rotational motion into linear motion. Driving the pinion into rotation causes the rack to be driven linearly. In the illustrated example, the gear 474 is the pinion and the first extension shaft 240 (comprising the plurality of teeth-like structures 242) is the rack. Causing the gear 474 to rotate on its own axis results in the displacement of the first extension shaft 240. A direction of displacement of the extension shaft will depend on a direction of rotation of the gear.

A working mechanism of the retractile tail pipe system may include actuating the gear 474 in the ETRM 230. The gear 474 may be actuated or energized by the electric motor 462, for example. The electric motor 462 may generate force and apply torque on the motor shaft 468 causing the motor shaft 468 to rotate. The motor shaft 468 is coupled to the shaft 472 via the flexible coupler 470. Therefore, a rotation of the motor shaft 468 may cause the torque to be transferred downstream, thereby causing the shaft 472 to rotate. Since the gear 474 is connected to the shaft 472, a rotation of the shaft 472 may, in turn, cause the gear 474 to rotate. As the gear 474 meshes with one of the extension shafts, a rotation of the gear 474 may cause the extension shafts to displace along the central axis 501. The rack and pinion mechanism helps to convert between rotational and linear movements, as described above. Depending on the rotational direction of the gear 474, the extension shafts may either move backward or forward within the threshold. The plurality of extension shafts is non-rotating and are fixed to the exhaust tip 110. Consequently, the displacement of the extension shafts along the central axis 501 may cause the exhaust tip 110 to either retract or extend back to the default position. More details on the method of retraction/extension of the exhaust tip 110 will be presented in FIG. 7.

Although, in the illustrated example, the first extension shaft 240 includes the teeth-like structures 242 and is configured to make contact with the gear 474; in other examples, however, the gear 474 may be configured to mesh with any of the plurality of extension shafts as long as the extension shaft in contact with the gear includes the teeth-like structures.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. Further, reference axes 299 is included in FIGS. 2A-B and 3, reference axes 499 is included in FIGS. 4A-B, and reference axes 599 is included in FIG. 5 in order to compare the views and relative orientations described above. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in at least one example. FIGS. 1-6 are drawn approximately to scale, although other dimensions or relative dimensions may be used.

FIG. 7 illustrates an example method 700 for the operation of the retractile tail pipe system, according to the present disclosure. In one example, the method 700 may include a retraction of the exhaust tip in response to an off-road condition. The method 700 may also include an extension of the exhaust tip from a retracted position under normal road conditions.

At 702, the method includes evaluating or assessing the conditions of the road surface on which a vehicle is moving. In one example, the road conditions may be evaluated by the driver of the vehicle and manually inputting the results to an input device that may provide signal to the exhaust tail pipe system. In other examples, the road conditions may be evaluated by one or more proximity sensors on the vehicle that may be capable of assessing and/or detecting off-road conditions and inputting the results to the input device.

At 704, it is determined whether or not off-road conditions are detected. If no off-road conditions are detected, go to 706, which includes maintaining the exhaust tip in a default extended position. However, if off-road conditions are detected at 704, the method continues to 708.

At 708, the method may include turning the electric motor on. The electric motor will actuate or energize the gear in the exhaust tip retractile module (ETRM). Subsequently, at 710, the gear will initiate rotation in a first rotational direction.

The method continues to 712, which includes initiation of displacement of the plurality of extension shafts. Since the gear engages with one of the extension shafts via a rack and pinion assembly, the rotation of the gear in the first rotational direction causes the extension shaft in contact to displace in a first direction. This, in turn, causes the remaining extension shafts to displace in the first direction automatically. Since the plurality of extension shafts are attached to the exhaust tip, the displacement of the extension shafts in the first direction, in turn, causes the exhaust tip to retract at step 714. After the exhaust tip is retracted up to a desired point within the threshold, turn off the electric motor at 716.

At 718, it is determined whether or not off-road conditions have ended by assessing the road surface in a similar manner as described previously at step 702. The assessment may be done either manually or by using sensors on the vehicle, as described previously. At 718, if off-road conditions are still detected, then go to 720, which includes maintaining the exhaust tip in the retracted position. However, if off-road conditions ended at 718, then the method continues to 722.

At 722, the method may include turning the electric motor on. The electric motor will actuate or energize the gear in the exhaust tip retractile module (ETRM). Subsequently, at 724, the gear will initiate rotation in a second rotational direction, opposite the first.

The method continues to 726, which includes initiation of displacement of the plurality of extension shafts. Since the gear engages with one of the extension shafts via a rack and pinion assembly, the rotation of the gear in the second rotational direction causes the extension shaft in contact to displace in a second direction, opposite the first. This, in turn, causes the remaining extension shafts to displace in the second direction automatically. Since the extension shafts are attached to the exhaust tip, the displacement of the extension shafts in the second direction, in turn, causes the exhaust tip to extend to the default position, at step 728. After the exhaust tip is extended back to the default position, turn off the electric motor at 730.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system for a vehicle, comprising:
an exhaust tube mounted to an underbody of the vehicle;
an exhaust tip slidably mounted to the exhaust tube, the exhaust tip having a plurality of extension shafts fixed on an end and arranged parallel to the exhaust tip; and an exhaust tip retract module positioned on the exhaust tube circumscribing an outer surface, the exhaust tip retract module having an actuator connected to one or more of the extension shafts.

2. The system of claim 1, wherein the actuator further comprises an electric motor that actuates a gear via a shaft with a coupler.

3. The system of claim 1, wherein the plurality of extension shafts is parallel to a central axis of the exhaust tube.

4. The system of claim 1, wherein one of the extension shafts further comprises a plurality of ridges on an external surface that engage with the gear.

5. The system of claim 1, wherein the exhaust tip is adapted to slide along the exhaust tube within a threshold beyond an end of the exhaust tube.

6. The system of claim 1, wherein rotation of the gear in the exhaust tip retract module causes a forward and backward movement of the plurality of extension shafts, such that the exhaust tip either retracts or extends.

7. The system of claim 6, wherein the exhaust tip receives torque via a rack and pinion mechanism.

8. The system of claim 1, wherein the extension shafts are supported by bearings.

9. An exhaust system for a vehicle, comprising:
an exhaust tube mounted to an underbody of the vehicle with an exhaust tip slidably mounted to the exhaust tube via a plurality of extensions shafts, the tube further having a surrounding housing enclosing an actuator coupled to the exhaust tip and further enclosing a support bearing for each of the plurality of extension shafts, the housing further enclosing a rack-and-pinion connection between the actuator and at least one of the extension shafts.

10. The system of claim 9, wherein the surrounding housing completely encloses the exhaust tube, the actuator, and a rack-and-pinion connection.

11. The system of claim 10, wherein a central axis of a rotating shaft of the actuator is perpendicular to a central axis of the exhaust tip and perpendicular to the extension shafts.

12. The system of claim 11, wherein the extension shafts are aligned parallel to the central axis of the exhaust tip.

13. The system of claim 12, wherein the actuator is coupled to only one of the extension shafts.

14. The system of claim 13, wherein the rotating shaft of the actuator includes a coupler mounted vertically above the exhaust tip central axis.

15. The system of claim 14, wherein a thickness of the surrounding housing is less than a diameter of the exhaust tip.

16. The system of claim 15, wherein the rack of the rack-and-pinion is positioned on a top surface of one of the extension shafts.

17. A method of adjusting length of a vehicle exhaust tip, comprising:
rotating an actuator shaft to extend extendible shafts mounted to the exhaust tip, the extendible shafts positioned parallel to a central axis of the exhaust tip and positioned fully exterior to an exhaust passage of the exhaust tip.

18. The method of claim 17, wherein the actuator shaft rotates forward and backward to extend and retract the exhaust tip.

19. The method of claim 18, wherein the exhaust tip slides over an outside of a fixed exhaust passage.

20. The method of claim 19, wherein the exhaust tip slides even while the vehicle is moving.

* * * * *